INVENTOR
Jacob Marlow
BY Birch and Birch
ATTORNEYS

INVENTOR
Jacob Marlow
BY Birch and Birch
ATTORNEYS

United States Patent Office 3,427,465
Patented Feb. 11, 1969

3,427,465
SOLID STATE POWER SWITCHING MEANS

Jacob Marlow, King of Prussia, Pa., assignor to Robertshaw Controls Company, Richmond, Va., a corporation of Delaware Filed July 26, 1965, Ser. No. 474,843
U.S. Cl. 307—38 20 Claims
Int. Cl. H02j 3/02, 3/14

ABSTRACT OF THE DISCLOSURE

A solid state power switching device for controlling the flow of power to either alternating or direct current loads is provided in which a single silicon controlled rectifier effects the necessary control for both cycles of applied alternating current from a source. Two full-wave rectifier bridge circuits, both supplied at the inputs thereof by the same source are connected such that the output of one is controlled by the silicon controlled rectifier and the output of the other is controlled and/or modulated as to phase and/or wave shape by a variable bias, saturable core, magnetic amplifier circuit. The output of the latter directly controls the gating of the silicon controlled rectifier and can effect either a normally open or normally closed mode of operation of the said silicon controlled rectifier. In the case of a direct current load, the load is connected in series with the anode-cathode path of the silicon controlled rectifier, across the output of the said one rectifier bridge. In the case of an alternating current load, the load is connected in series with the source across the input of the said one rectifier bridge.

This invention relates to solid state power switching means and more particularly to a solid state switchinng circuit of high reliability wherein a single solid state switching unit is utilized to effect full wave power control in response to relatively small input signal currents.

It is, therefore, an object of this invention to provide a new and novel solid state power switching means effecting full wave power control with a single solid state switching unit having greater reliability than conventional electro-mechanical relay means.

Another object of this invention is to provide new and novel solid state power switching means effecting full wave power control with a single solid state switching unit and a novel triggering circuit for same.

Still another object of this invention is to provide new and novel solid state power switching means effecting full wave power control with a single silicon controlled rectifier (SCR) as the switching unit therein and a new and novel trigger circuit for the said SCR.

Another object of this invention is to produce a novel control and firing circuit capable of generating unidirectional current pulses at a sufficient rate to effect full wave power control with a single SCR.

Still another object of this invention is to provide a solid state power switching means having complete isolation between the control input and power output.

Still another object of this invention is to provide a solid state power switching means readily convertible from a "normally open" to a "normally closed" mode of operation and vice-versa.

Yet another object of this invention is to provide new and novel solid state power switching means effecting full wave power control with a single silicon controlled rectifier (SCR) as the switching unit therein and a new and novel trigger circuit for the said SCR; said power switching means being fully capable of controlling the flow of power to a load over a readily adjustable range of input signals.

These and other objects of this invention will become more fully apparent with reference to the following specification and drawings which relate to a preferred embodiment of the invention.

Figure 1:
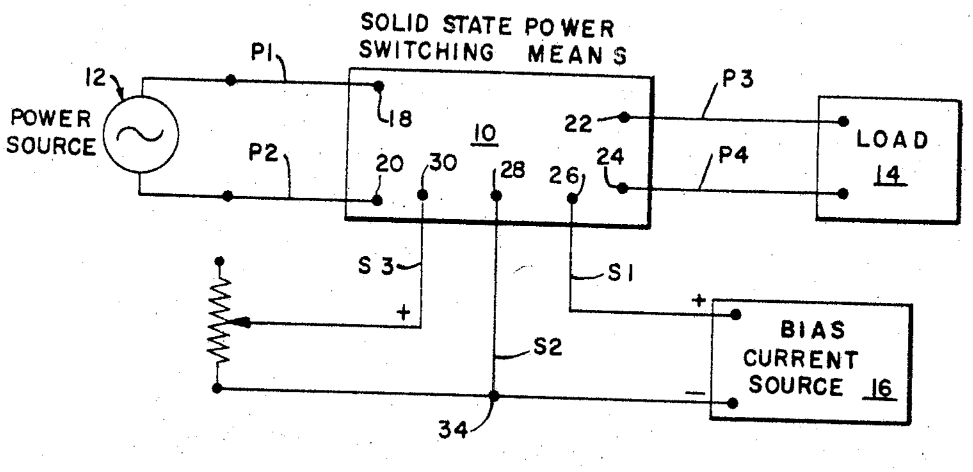
FIGURE 1 is a block diagram of a solid state power switching means of the present invention.

Referring in detail to the drawings and more particularly to FIGURE 1, the solid state power switching means 10 is shown in connection with a source of alternating current power 12, a load 14 and a bias and transducer current source 16.

The power source 12 is connected via power leads P1 and P2 to a pair of power input terminals 18 and 20, respectively, in the switching means 10.

The load 14 is connected through a pair of power leads P3 and P4 to a pair of power output terminals 22 and 24, respectively, in the switching means 10.

The bias and transducer current source 16 is connected via positive and negative signal leads S1 and S2, respectively, to bias and common input current terminals 26 and 28, respectively, in the switching means 10. A control current input terminal 30 in the switching means 10 is connected through a third signal lead S3 and a transducer means 32 (shown schematically as a variable resistance means), to a node 34 on the common signal lead S2.

Figure 2:
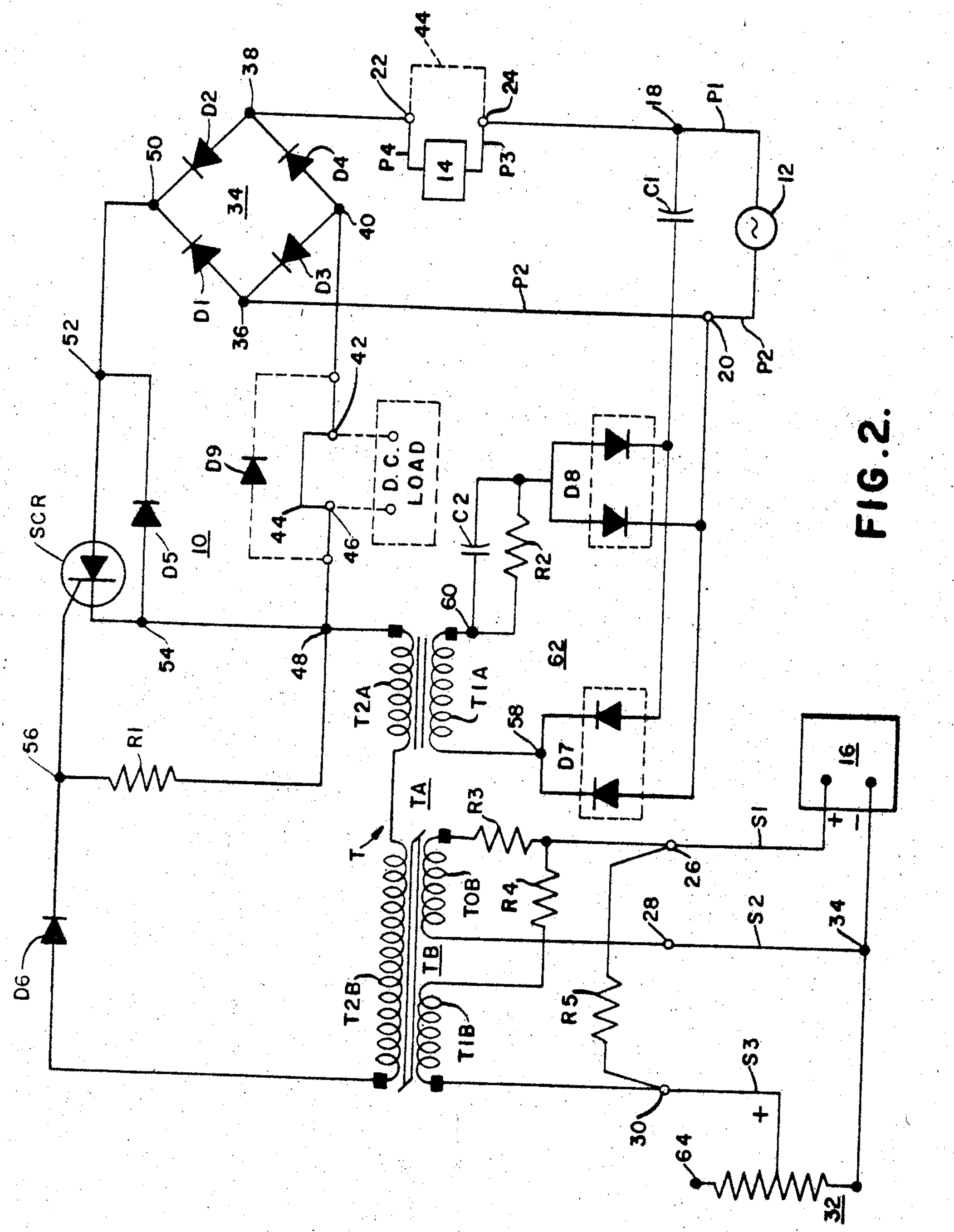
FIGURE 2 is a detailed schematic circuit diagram of the block diagram embodiment of FIGURE 1.

Referring next to FIGURE 2, the solid state power switching means 10 is shown in detail as including a first full wave rectifier bridge 34 comprising four diodes D1, D2, D3 and D4, respectively, connected at a first diagonal input terminal 36 to the power input lead P2 at input terminal 20 and at a second diagonal input terminal 38 through output terminal 22, power lead P4, load 14, power lead P3 and output terminal 24 to power input lead P1 at the input terminal 18. The load 14 will be hereinafter referred to as the A.C. load 14 in connection with the embodiments of FIGURES 2 and 3.

The first diagonal output terminal 40 of the first rectifier bridge 34 is connected with a first D.C. load terminal 42 and thence through a jumper 44 to a second D.C. load terminal 46, the latter being directly connected to a circuit junction 48.

The second diagonal output terminal 50 of the first rectifier bridge 34 is connected to the anode terminal 52 of a silicon controlled rectifier SCR, hereinafter referred to as the SCR, the latter including cathode and gate terminals 54 and 56, respectively.

The circuit junction 48 is connected directly to the cathode terminal 54 of the SCR; connected to the anode terminal 52 of the SCR via the anode-cathode path of a fifth diode D5; and connected through a series resistance R1 to the gate terminal 56 of the SCR in a first circuit branch and through the series connected split secondary windings T2A and T2B of a control transformer means T and the anode-cathode path of a sixth diode D6 in a second circuit branch.

The control transformer means T comprises a magnetic amplifier TB including the secondary winding T2B and a power input transformer TA. The power transformer TA includes a primary winding T1A having a sufficient number of turns to effect a predetermined step-down ratio to the secondary winding T2A and having first and second power input terminals 58 and 60 on opposite ends thereof.

Direct current power in the form of full-wave rectified current is fed through the power transformer primary T1A via a second full wave rectifier bridge circuit 62, the latter comprising a first diode pair D7 connected via the cathode-anode path of one diode from the first input terminal 58 of the transformer TA to the power lead P2 at the input terminal 20 and via the cathode-anode path of the other diode and a series capacitor C1 to the power lead P1 at the input terminal 18; and a parallel R-C circuit comprising a second capacitor C2 and resistance R2 connected in series between the second input terminal 60 of the transformer TA and a second diode pair D8, the latter having one diode connected through the capacitor C1 to the said power lead P1 and the other diode connected directly to the power lead P2 at the input terminals 18 and 20, respectively.

The magnetic amplifier TB includes a pair of signal input windings comprising a bias winding T0B and a control winding T1B. The bias winding T0B is connected on one side through a series resistance R3 to the positive signal lead S1 at the signal input terminal 26 and on the other side directly to the common signal lead S2 at the signal input terminal 28. The control winding T1B is connected on one side through a series resistance R4 to the positive signal lead S1 at the signal input terminal 26 and on the other side through the signal input terminal 30, signal lead S3, and transducer means 32 to the circuit junction 34 in the common signal lead S2.

The signal input terminals 26 and 30 are interconnected through a resistance R5.

As will be hereinafter more fully described in the description of operation of the embodiment of FIGURE 2, the solid state switching means is shown in the "normally open" mode of operation in FIGURE 2.

Should a D.C. load be required across the D.C. load terminals 42 and 46, the shunt 44 is removed and placed across the A.C. load terminals 22 and 24. Both the D.C. load and the alternate position of the shunt 44 are shown in dotted lines in FIGURE 2. In the case of an inductive D.C. load, the reverse current effect of such a load on the switching circuit is precluded by connecting a diode D9 in shunt with the D.C. load terminals 42 and 46, the anode and cathode thereof being connected, respectively, to the said load terminals 42 and 46 which comprise the negative and positive terminals, respectively, of the D.C. load.

Figure 3:
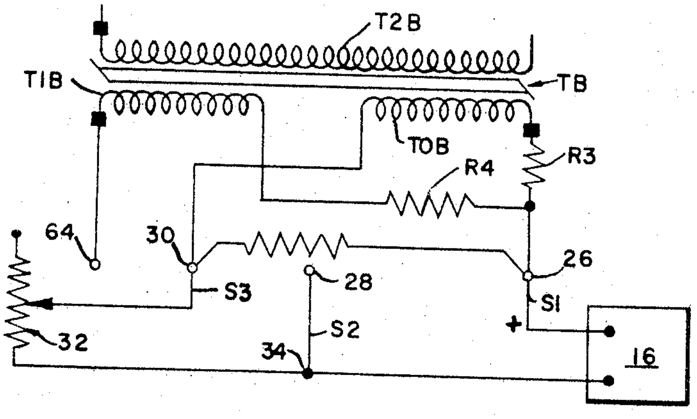
FIGURE 3 is another embodiment of the circuit of FIGURE 2.

Referring additionally to FIGURE 3, the circuit connections for converting the solid state power switching means 10 to a "normally closed" mode of operation are shown as including an additional open terminal 64 in the input signal terminal bank 26–28–30. The connection of the bias winding T0B to the common signal terminal 28 is broken and shifted to the signal terminal 30. The conversion is completed by removing the bias and transducer supply 16, connecting signal lead S1 directly to signal lead S2, and by breaking the connection of the control winding T1B with the signal terminal 30 and shifting this connection to the open terminal 64. Thus, in actuality, the effect of the original control winding T1B on the magnetic amplifier TB is precluded in the "normally closed" mode of operation. The function of control is taken over by original bias winding T0B.

*Operation*

Referring first to FIGURE 2, the operation of that embodiment of the present invention will now be described.

Assuming first that an A.C. load 14 s connected across the A.C. load terminals 22 and 24; that the shunt 44 is connected across the D.C. load terminals 42 and 46; and that a sufficient signal has been applied to the gate terminal 56 of the SCR to render the latter conductive, one-half cycle of alternating current input from the A.C. source 12 will flow from one side of the source 12 through the input terminal 18 and power lead P1. A.C. output terminals 22 and 24 and A.C. load 14, input terminal 38 and diode D2 of the first rectifier bridge 34, output terminal 50 of the said bridge 34, anode and cathode terminals 52 and 54 of the SCR, junction 48, D.C. load terminals 42 and 46 and shunt 44, output terminal 40 and diode D3 of the said bridge 34, power lead P2 and second power input terminal 20, back to the other side of the A.C. source 12.

The alternate half-cycle of alternating current input from the A.C. source 12 will flow from the said other side of the source 12 through power lead P2 and input terminal 20, input terminal 36 and diode D1 of the first rectifier bridge 34, output terminal 50 of said bridge, anode and cathode 52 and 54 of the SCR, junction 48, D.C. load terminals 42 and 46 and shunt 44, output terminal 40 and diode D4 of the said bridge 34, input terminal 38 of the said bridge 34, A.C. load terminals 22 and 24 and A.C. load 14, input terminal 18 and power lead P1 back to the opposite side of the source 12.

Thus, the A.C. power flow path is fully established and shown to be through the anode-cathode path of the SCR for both half-cycles of the input wave from the source 12. It is also readily seen that the presence of a D.C. load, either inductive or resistive, at the D.C. load terminals 42 and 46 and the connection of the shunt 44 across the A.C. load terminals 22 and 24 result in direct current flow through the said D.C. load, both positively oriented pulses or half-cycles of the full-wave rectified input passing through the SCR as described above.

The foregoing description assumed the existence of a sufficient gate signal to effect conduction of the SCR and the presence or absence of such a gate signal is, therefore, the controlling influence as to whether or not a given half-cycle of the input wave will pass through the SCR.

Gate signal current is provided by means of the second full-wave rectifier bridge 62 which results in a full wave form being applied to the primary T1A of the transformer TA and thus, in a full wave form being induced in the secondary T2A. Thus, current flow is established through the magnetic amplifier secondary T2B, diode D6, into gate terminal 56 as well as through the limiting resistor R1 which is in parallel with the gate-to-cathode path of the SCR.

Figure 4:
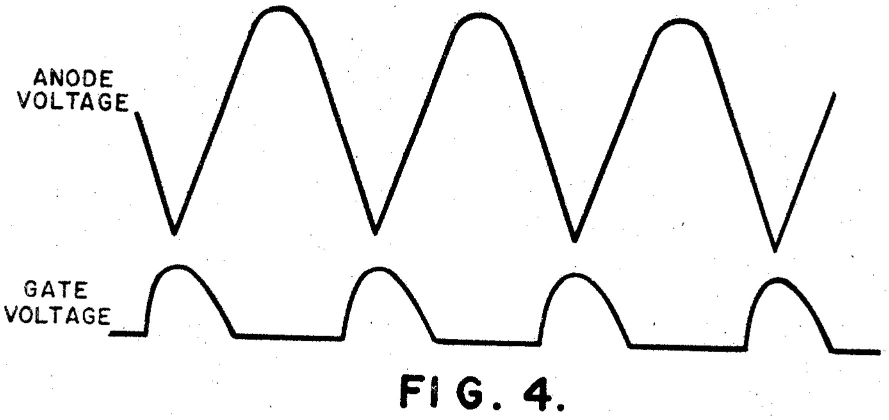
FIGURE 4 is a comparison of particular waveform present during the operation of the embodiments of FIGURES 2 and 3.

By proper selection of the parameters of the capacitors C1 and C2 and the resistance R2 in the second rectifier bridge 62, the wave form induced in the secondary winding T2B has a predominant frequency component of twice the power input frequency but with a limited direct current component and in addition is shifted in phase, as illustrated in FIGURE 4, such that the resulting pulse peaks of the gate voltage signal wave occur at substantially the same point in time as the minimum or zero values of the anode voltage half-cycles being applied to the SCR from the output of the bridge 34.

The current flow through the diode D6 and gate winding T2B being unidirectional, causes saturation of the saturable core of the magnetic amplifier TB, thereby permitting maximum flow of gate current into the gate terminal 56 of the SCR at the commencement of each half-cycle of voltage applied to the anode terminal 52 thereof by effecting minimum reactance in the gate winding T2B. As previously indicated the resistor R1 provides a shunt path limiting the quiescent current flow to the gate terminal 56 to a predetermined maximum.

The foregoing gate signal discussion assumed no bias or control currents present in the bias and control windings T0B and T1B, respectively, of the magnetic amplifier TB.

Now, assuming that the bias winding T0B is energized by the bias and transducer current supply means 16, via the signal lead S1, signal terminal 26, resistance R3, signal terminal 28 and signal lead S2, and that sufficient current is provided to reset the saturable core of the magnetic amplifier TB and restore maximum impedance to the gate control winding T2B, the gate signal in the secondary T2A of the transformer TA is prevented from supplying sufficient gate current to the gate terminal 56 to render the SCR conductive. Since the bias current is a constantly applied direct current, the entire solid state power switching means 10 is thus maintained in a "normally open" mode of operation.

In order to "close" the switching means 10, i.e. render the SCR conductive, the control winding T1B of the magnetic amplifier TB must be energized in an opposing sense to the bias winding T0B such that the resetting action of the magnetic flux of the said bias winding is nullified and the impedance of the gate control winding T2B is reduced to a minimum, causing the gate current to increase therethrough and render the SCR conductive, thereby switching power to either the A.C. load 14 or the D.C. load as the case may be.

The control winding T1B is energized in response to a monitored condition at the transducer means via the signal terminal 30, transducer means 32 and signal lead S3 on one side and resistance R4, signal terminal 26 and signal lead S1, on the other side. The resistance R5 maintains a predetermined initial current level to the transducer means 32.

In the "normally closed" mode of operation, reference now being made to FIGURE 3, the original control winding T1B is open circuited. Thus, the only controlling constraint placed on the magnetic amplifier at the signal input side thereof is by the original bias winding T0B, which in this mode will be control winding.

In this embodiment, the original bias winding T0B is subjected to the control current flowing through the transducer 32 from the bias and transducer means 16, in an opposite polarity sense from the bias current of FIGURE 2, through the signal lead S3 and signal terminal 30. Now, if a given response value of control current is selected such that it is just sufficient to reset the core of the magnetic amplifier TB, then the presence of any control current less than said given response value will prevent the inducement of sufficient flux in the said core of the magnetic amplifier TB to reset the said core and the maximum gate current will continue to flow in the gate control winding T2B, thereby maintaining the SCR and the entire switching means 10 in a "normally closed" switching condition, opening only upon the occurrence of the said given response value of control current from the transducer means 32.

In view of the foregoing specification and drawings, it can be readily seen that this invention provides a new and novel solid state power switching means having a minimum number of components, high versatility as to the type of load supplied thereby and readily convertible between a number of modes of operation.

What is claimed is:

1. Solid state power switching means for controlling the flow of power from a source to a load comprising first and second rectifier means having input terminals adapted to be connected to a source of alternating current and having output terminals; solid state switch means connected across said output terminals of said first rectifier means controlling the flow of power through said first rectifier means including a gate terminal; impedance means in said second rectifier means altering the waveform and phase of the voltage output of said second rectifier means with respect to the waveform and phase of voltage output of said first rectifier means; and circuit means coupling said voltage output of said second rectifier means to said gate terminal of said solid state switch means.

2. The invention defined in claim 1, wherein said circuit means further includes input responsive means, adapted to be energized by an input signal, constraining said circuit means to control the magnitude of the signal applied to the said gate terminal of said solid state switch means, thereby controlling the flow of power through said first rectifier means and said solid state switch means.

3. The invention defined in claim 1, wherein said power switching means further includes means connecting an alternating current load in series with said source and an input terminal of said first rectifier means.

4. The invention defined in claim 1, wherein said power switching means further includes means connecting an alternating current load in series with said source and an input terminal of said first rectifier means; and further wherein said circuit means further includes input responsive means, adapted to be energized by an input signal, constraining said circuit means to control the magnitude of the signal applied to the said gate terminal of said solid state switch means, thereby controlling the flow of power through said first rectifier means and said solid state switch means.

5. The invention defined in claim 1, wherein said power switching means further includes means connecting a direct current load in series between said solid state switch means and one of said output terminals of said first rectifier means.

6. The invention defined in claim 1, wherein said power switching means further includes means connecting a direct current load in series between said solid state switch means and one of said output terminals of said first rectifier means; and further wherein said circuit means further includes input responsive means, adapted to be energized by an input signal, constraining said circuit means to control the magnitude of the signal applied to the said gate terminal of said solid state switch means, thereby controlling the flow of power through said first rectifier means and said solid state switch means.

7. The invention defined in claim 1, wherein said power switching means further includes means connecting a direct current inductive load in series between said solid state switch means and one of said output terminals of said first rectifier means, and unidirectional current conducting means in shunt with said means.

8. The invention defined in claim 1, wherein said power switching means further incluudes means connecting a direct current inductive load in series between said solid state switch means and one of said output terminals of said first rectifier means, and unidirectional current conducting means in shunt with said means; and further wherein said circuit means further includes input responsive means, adapted to be energized by an input signal, constraining said circuit means to control the magnitude of the signal applied to the said gate terminal of said solid state switch means, thereby controlling the flow of power through said first rectifier means and said solid state switch means.

9. Solid state power switching means for controlling the flow of power from a source to a load in response to an input signal comprising, first and second rectifier means having input terminals adapted to be connected with a power source of alternating current and having output terminals; a three terminal solid state switch means having anode and cathode terminals respectively connected with the said output terminals of said first rectifier means and a gate terminal adapted to receive a gating signal; said anode terminal receiving a predetermined output voltage waveform from said first rectifier means; impedance means in said second rectifier means altering the waveform and phase of the voltage output of said second rectifier means with respect to the said predetermined waveform applied to the said anode of said solid state switch means, thereby providing a gating signal; and circuit means including magnetic amplifier means having a gate control winding in series with the output of said first rectifier means and said gate terminal, a saturable core and input winding means, said input winding means being adapted to receive input signals and vary the impedance of said gate control winding in response to said input signals, thereby controlling the magnitude of the gating signal applied to said gate terminal and controlling the flow of power to said load, through said solid state switch means, as a function of said input signals.

10. The invention defined in claim 9, wherein said input winding means comprises a bias winding adapted to be continuously energized with a bias current in flux inducing opposition in said saturable core to the energization of said gate control winding by said gating signal to effect maximum series impedance in said gate control winding to the passage of said gating signal and a control winding adapted to be energized at random by an input signal, in flux inducing opposition to the effect of said bias winding on said saturable core such that upon the occurrence of an input signal in said control winding the said series impedance of said gate control winding is reduced and said gating signal is permitted to render said solid state switch means conductive in response thereto.

11. The invention defined in claim 9, wherein said input winding means comprises a control winding adapted to be intermittently energized by an input signal in flux inducing opposition in said saturable core to the energization of said gate control winding by said gating signal, said gating signal effecting saturation of said core and minimum series impedance of said gate control winding to the passage of said gating signal such that said solid state switch means is rendered conductive, such that upon the occurrence of an input signal of sufficient predetermined magnitude, said saturable core is reset, effecting maximum series impedance in said gate control winding and said solid state switch means is rendered non-conductive in response thereto.

12. The invention defined in claim 9, wherein said impedance means includes a phase shift network and power transformer means connected in circuit with the said output terminals of said rectifier means, said power transformer means including a gating signal output winding connected in series with said cathode terminal, said gate control winding and said gate terminal.

13. The invention defined in claim 9, wherein said rectifier means comprise full wave rectifier circuits; wherein said solid state switch means comprises a silicon controlled rectifier; wherein said predetermined wave form applied to said anode is a series of positive half-cycle; and wherein said gating signal wave form is a series of positive pulses of the same recurrent frequency as said predetermined wave form shifted in phase with respect thereto such that the maximum amplitudes of said gating signal substantially coincide in time with the minimum amplitudes of said predetermined wave form, whereby the said SCR is gated for each half-cycle supplied thereto from said power source through said first rectifier means.

14. The invention defined in claim 9, wherein said power switching means further includes means connecting an alternating current load in series with said source and an input terminal of said first rectifier means.

15. The invention defined in claim 9, wherein said power switching means further includes means connecting an alternating current load in series with said source and an input terminal of said first rectifier means; and further wherein said rectifier means comprise full wave rectifier circuits; wherein said solid state switch means comprises a silicon controlled rectifier; wherein said predetermined wave form applied to said anode is a series of positive half-cycle; and wherein said gating signal wave form is a series of positive pulses of the same recurrent frequency as said predetermined wave form shifted in phase with respect thereto such that the maximum amplitudes of said gating signal substantially coincide in time with the minimum amplitudes of said predetermined wave form, whereby the said SCR is gated for each half-cycle supplied thereto from said power source through said first rectifier means.

16. The invention defined in claim 9, wherein said power switching means further includes means connecting a direct current load in series between said solid tsate switch means and one of said output terminals of said first rectifier means.

17. The invention defined in claim 9, wherein said power switching means further includes means connecting a direct current load in series between said solid state switch means and one of said output terminals of said first rectifier means; and further wherein said rectifier means comprise full wave rectifier circuits; wherein said solid state switch means comprises a silicon controlled rectifier; wherein said predetermined wave form applied to said anode is a series of positive half-cycle; and wherein said gating signal wave form is a series of positive pulses of the same recurrent frequency as said predetermined wave form shifted in phase with respect thereto such that the maximum amplitudes of said gating signal substantially coincide in time with the minimum amplitudes of said predetermined wave form, whereby the said SCR is gated for each half-cycle supplied thereto from said power source through said first rectifier means.

18. The invention defined in claim 9, wherein said power switching means further includes means connecting a direct current inductive load in series between said solid state switch means and one of said output terminals of said first rectifier means, and unidirectional current conducting means in shunt with said means.

19. The invention defined in claim 9, wherein said power switching means further includes means connecting a direct current inductive load in series between said solid state switch means and one of said output terminals of said first rectifier means, and unidirectional current conducting means in shunt with said means; and further wherein said rectifier means comprise full wave rectifier circuits; wherein said solid state switch means comprises a silicon controlled rectifier; wherein said predetermined wave form applied to said anode is a series of positive half-cycle; and wherein said gating signal wave form is a series of positive pulses of the same recurrent frequency as said predetermined wave form shifted in phase with respect thereto such that the maximum amplitudes of said gating signal substantially coincide in time with the minimum amplitudes of said predetermined wave form, whereby the said SCR is gated for each half-cycle supplied thereto from said power source through said first rectifier means.

20. The invention defined in claim 9, wherein said circuit means further includes unidirectional conductive means in series with said gate terminal and said gate control winding and impedance means connected between said gate and said cathode terminals; and wherein said cathode terminal and said anode terminal are interconnected through unidirectional conductive means.

References Cited

UNITED STATES PATENTS

| | | | |
|---|---|---|---|
| 3,286,158 | 11/1966 | Thatcher | 307—88.5 |
| 3,311,806 | 3/1967 | Charlwood | 307—88.5 |

ROBERT K. SCHAEFER, *Primary Examiner.*

H. J. HOHAUSER, *Assistant Examiner.*